W. S. WATSON.
PROCESS OF TREATING THE CANDELILLA PLANT FOR THE RECOVERY OF WAX.
APPLICATION FILED JULY 22, 1911.
1,042,992.
Patented Oct. 29, 1912.
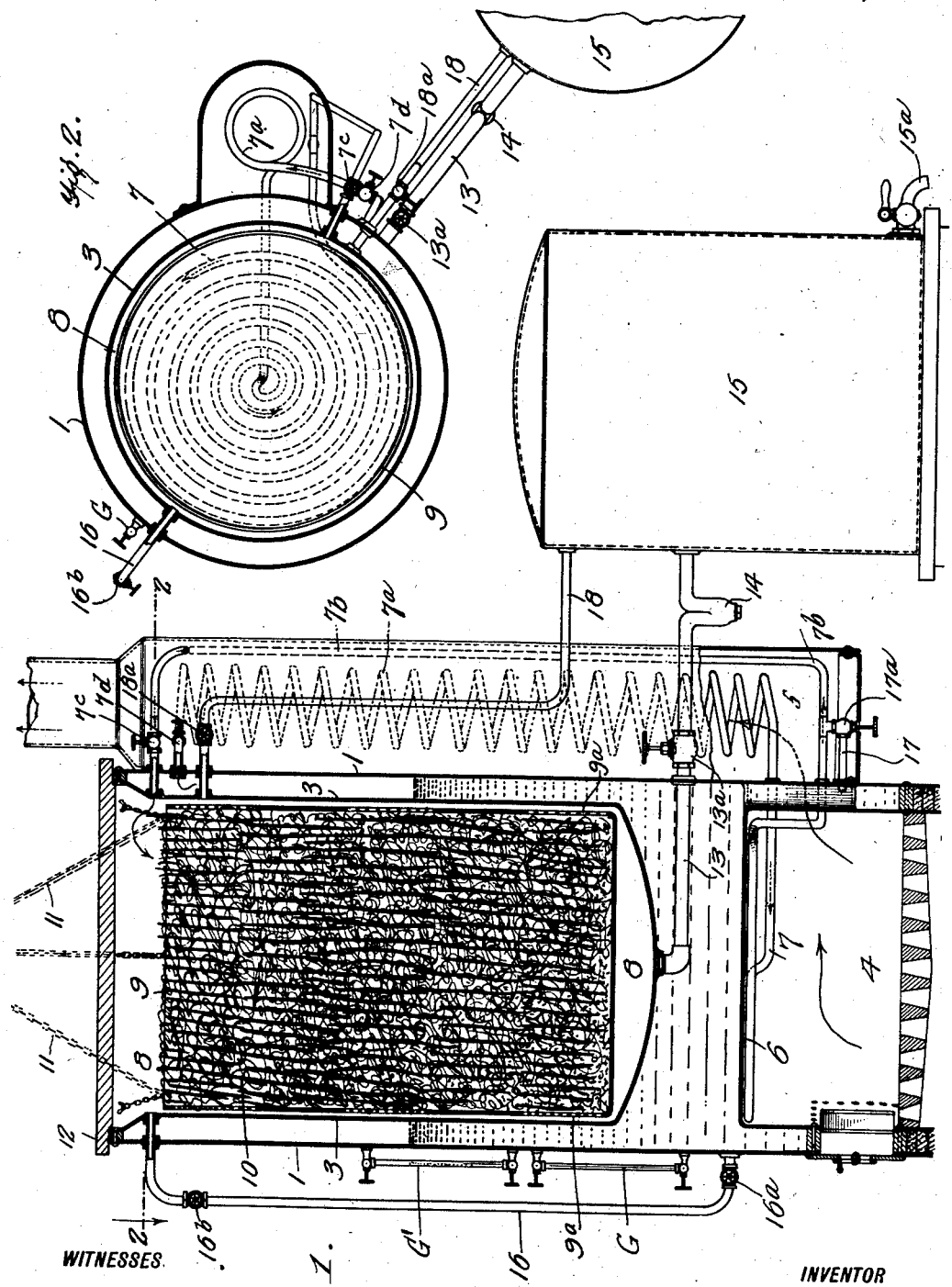
WITNESSES.
INVENTOR
WINFIELD SCOTT WATSON,
BY
ATTORNEYS

UNITED STATES PATENT OFFICE.

WINFIELD S. WATSON, OF MEMPHIS, TENNESSEE.

PROCESS OF TREATING THE CANDELILLA-PLANT FOR THE RECOVERY OF WAX.

1,042,992. Specification of Letters Patent. Patented Oct. 29, 1912.

Application filed July 22, 1911. Serial No. 639,963.

*To all whom it may concern:*

Be it known that I, WINFIELD S. WATSON, a citizen of the United States, and a resident of Memphis, in the county of Shelby and State of Tennessee, have made certain new and useful Improvements in Processes of Treating the Candelilla-Plant for the Recovery of Wax, of which the following is a specification.

My invention relates to improvements in process of treating the candelilla plant for the recovery of wax, and it consists in the various steps set forth.

An object of my invention is to provide a process for treating the candelilla plant in order to recover the wax which it contains and leave the plant in such a condition that it may be used subsequently for fuel.

A further object of my invention is to provide a process for dry heating the plant and for subsequently treating the plant by dry steam, with a final treatment of water.

A further object of my invention is to provide a process by means of which the wax, which adheres tenaciously to the plant may be economically recovered without the use of chemicals.

A further object of my invention is to provide a simple process by means of which the wax may be recovered without any danger of overheating the plant to the point of destructive distillation.

Other objects and advantages will appear in the following specification and the novel features of the invention will be particularly pointed out in the appended claims.

My invention is illustrated in the accompanying drawings forming part of this application in which—

Figure 1 is a vertical section through the device, and Fig. 2 is a horizontal section along the line 2—2 of Fig. 1, the shrubs being omitted for the sake of clearness.

The candelilla plant is a shrub which is found in the semi-arid regions of Mexico and in the southwestern parts of the United States and contains a great deal of wax, of high melting point. This wax appears on the growing plant on the outside, and in the pores of the bark of the plant. The green plant contains 70% of moisture. The wax cannot be satisfactorily obtained in the ordinary way by boiling or steaming, since it will melt into a varnish-like mass which will stick to the plant tenaciously and which the water or steam will not easily remove. For this reason other methods have to be employed.

In carrying out my invention, I provide a casing 1 which constitutes the outer wall of a boiler, the inner wall being formed by the wall 3. Below the boiler is a fire box 4 and at the rear is a flue 5. Beneath the crown sheet 6 of the boiler is a coiled tube 7 which has branches $7^a$ and $7^b$ extending up through the flue 5. The cylindrical casing 8 formed by the annular walls of the boiler provides a receptacle for a perforated holder 9 which is arranged to receive the shrubs or plants 10. This holder is portable and may be lifted out by means of chains 11 attached to the top. While I have shown only one of these holders, it will be understood that in practice a plurality of the holders and boilers are used. The upper part of the receptacle 8 may be covered by a closure 12.

The receptacle 8 is provided with a pipe 13 having a valve $13^a$ and a trap 14. The trap is connected with a condenser 15. The receptacle 8 may be put in communication with the boiler by means of a pipe 16 which is provided with valves $16^a$ and $16^b$. The branch $7^b$ of the coil 7 may be connected with the boiler by means of a pipe 17 and valve $17^a$. A pipe 18 having a valve $18^a$ leads from the receptacle 8 into the condenser 15.

From the foregoing description of the various parts of the device the operation thereof may be readily understood.

The plants are first placed in the holder 9 in the manner shown in Fig. 1. This holder is then lowered into the receptacle 8. The water in the boiler is heated to approximately 300° F. and the plants are subjected to dry heat. This turns the water of the plants into steam which forces out the wax and the latter owing to its high viscosity assumes the form of bubbles having a frothy appearance on the stems. The expanding moisture has a tendency to force the bubbles downward to the open aperture at the base of the receptacle. Part of the wax in this melted state runs down, passing out through the pipe 13 into the wax trap 14 from whence it may be drawn off. The cock $7^d$ is opened permitting the dry steam of the boiler to enter the coil $7^a$ where it is superheated and this superheated dry steam is permitted to escape from the upper end of the pipe 7$^b$, the stop cock 7$^c$ being turned to permit its entrance into the receptacle 8. The dry steam serves the purpose of immediately raising the temperature of the shrubs to a considerably higher point and the steam passing through the mass of shrubs carries with it the wax. The steam and wax are carried out through the pipe 13, the wax being trapped off in the trap 14, the steam being condensed in the condenser 15. It will be noted that the separation of the wax from the shrub is accomplished partly by heat and partly by the actual contact of the dry steam with the bubbles of wax, the steam forcing the wax downwardly. After the plants have been subjected to the dry steam the cock 17$^a$ is opened and water flows from the boiler through the pipe 17 into the coil 7 and thence by means of the pipe 7$^b$ onto the shrubs in the holder 9, this movement of the water being occasioned by the steam pressure within the boiler. The water washes out mechanically any remaining bubbles of wax on the shrubs and passes out through the bottom of the receptacle and through the pipe 13 into the condenser 15, the wax being trapped off at the trap 14. By the means just described the greater portion of the wax is procured. Some of the wax however will be carried by the steam into the condenser 15. The condensed water in the condenser 15 may be drawn off at the faucet 15$^a$ and the solidified wax may be recovered from the condenser. The wax in the condenser 15 contains considerable moisture, which may be expelled by gathering the solidified wax, placing it in the receptacle 8 and heating. The stop cock 18$^a$ is opened and the moisture is allowed to pass through the pipe 18 into the condenser 15, the melted wax running through the pipe 13 and being trapped off at the trap 14 as described. By opening the cocks 16$^a$ and 16$^b$ of the pipe 16 the water in the boiler may be driven through the pipe 16 to wash out the receptacle 8.

The shrubs from which the wax has been extracted form an excellent fuel which in a barren country is a very important item.

Gages G and G′ are provided for indicating the height of the water in the boiler.

In order to facilitate the outflow of wax the holder 9 is perforated as shown at 9$^a$.

The cover 12 may be of sufficient weight so as to hermetically seal the receptacle and it may be secured in any suitable manner.

It will be noted that the flue 5 forms part of the main exit for the products of combustion in the fire box 4, and that the coil 7$^a$ within the flue is therefore heated to a considerable degree by the products of combustion which would otherwise escape. The apparatus is therefore economical.

I claim:

1. The herein described process of recovering wax from the candelilla plant, which consists in subjecting the plants to a dry heat of approximately 300° F., whereby the moisture in the plant is changed into steam for expelling the wax, subsequently passing dry steam of a greater temperature downwardly through the mass of plants for mechanically carrying downwardly portions of the wax adhering to the plants, and subsequently passing a stream of hot water downwardly through the plants for washing off any remaining portions of the wax.

2. The herein described process of recovering wax from the candelilla plant, which consists in subjecting the plants to a dry heat, whereby the moisture in the plant is changed into steam for expelling the wax, subsequently passing dry steam of a greater temperature downwardly through the mass of plants for mechanically carrying down portions of the wax adhering to the plants, and subsequently passing a stream of hot water downwardly through the plants for washing off any remaining portions of the wax.

WINFIELD S. WATSON.

Witnesses:
L. A. STANLEY,
SOLON C. KEMON.